United States Patent
Astigarraga et al.

(10) Patent No.: US 11,205,057 B2
(45) Date of Patent: *Dec. 21, 2021

(54) COMMUNICATION ASSISTANT TO BRIDGE INCOMPATIBLE AUDIENCE

(71) Applicant: International Business Machines Corporation, Armonk, NY (US)

(72) Inventors: Tara Astigarraga, Fairport, NY (US); Itzhack Goldberg, Hadera (IL); Jose R. Mosqueda Mejia, Michoacan (MX); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,978

(22) Filed: Dec. 20, 2019

(65) Prior Publication Data
US 2020/0125807 A1    Apr. 23, 2020

Related U.S. Application Data

(63) Continuation of application No. 15/160,431, filed on May 20, 2016, now Pat. No. 10,579,743.

(51) Int. Cl.
*G06F 40/58* (2020.01)
*G06F 3/0482* (2013.01)
(Continued)

(52) U.S. Cl.
CPC ............ *G06F 40/58* (2020.01); *G06F 3/0482* (2013.01); *G06F 40/157* (2020.01);
(Continued)

(58) Field of Classification Search
None
See application file for complete search history.

(56) References Cited

U.S. PATENT DOCUMENTS

| 4,459,049 A | 7/1984 | Howell et al. |
| 4,760,528 A | 7/1988 | Levin |

(Continued)

FOREIGN PATENT DOCUMENTS

| EP | 1639943 A1 | 3/2006 |
| WO | 2005074230 A2 | 8/2005 |

(Continued)

OTHER PUBLICATIONS

Wikipedia, "CAGE Distance Framework", Mar. 16, 2015, 4 pages, https://en.wikipedia.org/wiki/CAGE_Distance_Framework, https://web.archive.org/web/20150316061937/https://en.wikipedia.org/wiki/CAGE_Distance_Framework (Year: 2015).*

(Continued)

*Primary Examiner* — Benjamin Smith
(74) *Attorney, Agent, or Firm* — Scully, Scott, Murphy & Presser, P.C.; Samuel A. Waldbaum

(57) ABSTRACT

A cognitive communication assistant receives a message transmitted over a communication network from a sender to a recipient. A sender's industry identified with the sender and a recipient's industry identified with the recipient are determined. One or more terms associated with the sender's industry are extracted from the message. A definition associated with the one or more terms is searched for in an on-line reference text. The message is updated based on the definition. The message is transmitted over the communication network to the recipient.

20 Claims, 4 Drawing Sheets

(51) Int. Cl.
  *G06F 40/40*     (2020.01)
  *G06F 40/51*     (2020.01)
  *H04L 12/58*     (2006.01)
  *G06F 40/166*    (2020.01)
  *G06F 40/157*    (2020.01)
  *H04L 29/08*     (2006.01)
  *G06F 40/151*    (2020.01)
  *G06F 16/9535*   (2019.01)

(52) U.S. Cl.
  CPC ............ *G06F 40/166* (2020.01); *G06F 40/40* (2020.01); *G06F 40/51* (2020.01); *H04L 51/18* (2013.01); *G06F 40/151* (2020.01); *H04L 67/306* (2013.01)

(56) References Cited

U.S. PATENT DOCUMENTS

| | | | |
|---|---|---|---|
| 5,247,591 | A | 9/1993 | Baran |
| 5,634,084 | A * | 5/1997 | Malsheen ............... G10L 13/08 704/260 |
| 6,279,018 | B1 | 8/2001 | Kudrolli et al. |
| 6,671,670 | B2 | 12/2003 | Levin et al. |
| 6,684,211 | B1 | 1/2004 | Nguyen |
| 6,708,311 | B1 | 3/2004 | Berstis |
| 6,934,767 | B1 | 8/2005 | Jellinek |
| 7,003,724 | B2 | 2/2006 | Newman |
| 7,028,038 | B1 * | 4/2006 | Pakhomov ............ G06F 40/284 707/765 |
| 7,092,928 | B1 | 8/2006 | Elad et al. |
| 7,236,923 | B1 | 6/2007 | Gupta |
| 7,293,074 | B1 | 11/2007 | Jellinek et al. |
| 7,515,903 | B1 | 4/2009 | Cast |
| 7,831,423 | B2 | 11/2010 | Schubert |
| 7,848,918 | B2 | 12/2010 | Li et al. |
| 7,885,949 | B2 | 2/2011 | Gabbert et al. |
| 7,895,032 | B2 | 2/2011 | Mullen |
| 8,171,403 | B2 | 5/2012 | Flint et al. |
| 8,209,183 | B1 * | 6/2012 | Patel ....................... G06K 9/72 704/270 |
| 8,358,641 | B2 | 1/2013 | Hopkins |
| 8,412,524 | B2 | 4/2013 | Schubert |
| 8,498,999 | B1 * | 7/2013 | Bhalotia ............. G06F 16/3322 707/767 |
| 8,504,369 | B1 | 8/2013 | Chigier et al. |
| 8,504,559 | B1 * | 8/2013 | Elman ................ G06Q 10/1053 707/722 |
| 8,515,755 | B2 | 8/2013 | Schubert |
| 8,713,000 | B1 | 4/2014 | Elman et al. |
| 8,739,031 | B2 | 5/2014 | Cheung et al. |
| 8,798,016 | B2 | 8/2014 | Hopkins |
| 8,831,519 | B2 | 9/2014 | Ghaboosi et al. |
| 8,897,709 | B2 | 11/2014 | Valetine |
| 8,996,352 | B2 | 3/2015 | Orsini et al. |
| 9,031,829 | B2 | 5/2015 | Leydon et al. |
| 9,042,829 | B2 | 5/2015 | Palin et al. |
| 9,128,579 | B2 * | 9/2015 | Sishtla ..................... G06F 3/048 |
| 9,231,898 | B2 | 1/2016 | Orsini et al. |
| 9,311,286 | B2 | 4/2016 | Bank et al. |
| 9,536,226 | B2 | 1/2017 | Elman et al. |
| 9,817,802 | B2 * | 11/2017 | Bank ..................... G06F 40/151 |
| 9,881,003 | B2 | 1/2018 | Hartrell et al. |
| 9,911,134 | B2 | 3/2018 | Gupta et al. |
| 10,210,147 | B2 | 2/2019 | DeLuca et al. |
| 2001/0049725 | A1 | 12/2001 | Kosuge |
| 2003/0018670 | A1 | 1/2003 | Ashford et al. |
| 2003/0134616 | A1 | 7/2003 | Thomson et al. |
| 2003/0139921 | A1 | 7/2003 | Byrd et al. |
| 2004/0128301 | A1 * | 7/2004 | Thint ................... G06F 16/9535 |
| 2005/0163135 | A1 | 7/2005 | Hopkins |
| 2005/0240391 | A1 | 10/2005 | Lekutai |
| 2006/0129633 | A1 * | 6/2006 | Potluri ................... G06F 40/12 709/203 |
| 2006/0167992 | A1 * | 7/2006 | Cheung ................ G06F 40/169 709/204 |
| 2007/0174045 | A1 * | 7/2007 | Kao ....................... G06F 40/295 704/4 |
| 2007/0276649 | A1 * | 11/2007 | Schubert ................ G06F 40/55 704/2 |
| 2007/0299925 | A1 | 12/2007 | Kirkland |
| 2008/0059152 | A1 * | 3/2008 | Fridman ............... G06F 40/247 704/9 |
| 2008/0195372 | A1 * | 8/2008 | Chin ....................... G06F 3/0481 704/2 |
| 2009/0055732 | A1 | 2/2009 | Motaparti et al. |
| 2009/0171937 | A1 | 7/2009 | Chen et al. |
| 2009/0248401 | A1 | 10/2009 | Grabarnik et al. |
| 2010/0131447 | A1 * | 5/2010 | Creutz ................... G06F 40/274 706/52 |
| 2010/0131900 | A1 | 5/2010 | Spetalnick |
| 2010/0169075 | A1 | 7/2010 | Raffa et al. |
| 2010/0305941 | A1 * | 12/2010 | Hogan ..................... G06F 40/20 704/9 |
| 2011/0046941 | A1 | 2/2011 | Manuel-Devados |
| 2011/0131486 | A1 | 6/2011 | Schubert |
| 2011/0138076 | A1 | 6/2011 | Spicer et al. |
| 2011/0212422 | A1 | 9/2011 | O'Donnell et al. |
| 2011/0244882 | A1 | 10/2011 | Hancock |
| 2012/0054645 | A1 | 3/2012 | Hoomani et al. |
| 2012/0159656 | A1 | 6/2012 | Gerber et al. |
| 2012/0173972 | A1 | 7/2012 | Schubert |
| 2012/0192059 | A1 | 7/2012 | Laskaris et al. |
| 2012/0239417 | A1 | 9/2012 | Pourfallah et al. |
| 2012/0239560 | A1 | 9/2012 | Pourfallah et al. |
| 2012/0290950 | A1 * | 11/2012 | Rapaport ........... H04N 21/8358 715/753 |
| 2012/0316965 | A1 * | 12/2012 | Mathews ........... G06Q 30/0269 705/14.61 |
| 2013/0110842 | A1 * | 5/2013 | Donneau-Golencer ...................... G06F 16/22 707/741 |
| 2013/0174030 | A1 * | 7/2013 | O'Sullivan ........... G06F 40/253 715/256 |
| 2013/0191738 | A1 | 7/2013 | Bank et al. |
| 2013/0191739 | A1 * | 7/2013 | Bank ..................... G06F 40/151 715/259 |
| 2013/0244216 | A1 | 9/2013 | DeGross |
| 2013/0268511 | A1 * | 10/2013 | Bailey ................... G06F 16/957 707/722 |
| 2013/0290439 | A1 | 10/2013 | Blom |
| 2013/0325550 | A1 | 12/2013 | Varghese et al. |
| 2013/0339870 | A1 * | 12/2013 | Sishtla ..................... G06F 9/454 715/744 |
| 2014/0081882 | A1 * | 3/2014 | Govindaraman ...... G06Q 50/01 705/319 |
| 2014/0189017 | A1 | 7/2014 | Prakash et al. |
| 2014/0222702 | A1 | 8/2014 | Jennings |
| 2014/0229155 | A1 * | 8/2014 | Leydon ............... G07F 17/3255 704/2 |
| 2014/0244327 | A1 | 8/2014 | Baldwin et al. |
| 2014/0244335 | A1 | 8/2014 | Baldwin et al. |
| 2014/0244530 | A1 | 8/2014 | Baldwin et al. |
| 2014/0244531 | A1 * | 8/2014 | Baldwin ................ G06Q 50/01 705/319 |
| 2014/0256297 | A1 | 9/2014 | Cast |
| 2014/0289140 | A1 | 9/2014 | Vijayant |
| 2014/0303960 | A1 * | 10/2014 | Orsini ..................... H04L 51/04 704/2 |
| 2014/0303961 | A1 | 10/2014 | Leydon et al. |
| 2014/0310643 | A1 | 10/2014 | Karmanenko et al. |
| 2014/0337989 | A1 * | 11/2014 | Orsini ..................... G06F 40/51 726/26 |
| 2014/0372168 | A1 | 12/2014 | Markham |
| 2015/0025917 | A1 | 1/2015 | Stempora |
| 2015/0046353 | A1 | 2/2015 | Elman et al. |
| 2015/0067491 | A1 * | 3/2015 | Rajamony ............ G06F 40/274 715/271 |
| 2016/0070543 | A1 * | 3/2016 | Nethery, III ............. G06F 8/30 717/110 |
| 2016/0267497 | A1 * | 9/2016 | Li ........................... G06Q 50/01 |
| 2017/0083511 | A1 * | 3/2017 | Hartrell ................... G06F 17/00 |
| 2017/0091320 | A1 * | 3/2017 | Psota ................... G06F 16/334 |

(56) References Cited

U.S. PATENT DOCUMENTS

| | | | |
|---|---|---|---|
| 2017/0161685 A1 | 6/2017 | Jennings | |
| 2017/0206545 A1* | 7/2017 | Gupta | H04L 51/12 |
| 2017/0251985 A1* | 9/2017 | Howard | G16H 70/60 |
| 2017/0262451 A1* | 9/2017 | Milner | G06Q 50/01 |
| 2018/0067912 A1* | 3/2018 | DeLuca | G06F 40/258 |
| 2018/0253802 A1 | 9/2018 | Govindaraman | |

FOREIGN PATENT DOCUMENTS

| | | |
|---|---|---|
| WO | 2010123577 A2 | 10/2010 |
| WO | 2014105859 A1 | 7/2014 |
| WO | 2014144663 A1 | 9/2014 |
| WO | 2014145432 A2 | 9/2014 |
| WO | 2014198325 A1 | 12/2014 |
| WO | 2015179522 A1 | 11/2015 |

OTHER PUBLICATIONS

Pankaj Ghemawat and Jordan Siegel, Cases about Redefining Global Strategy, Harvard Business Review Press, 2011, Chapter 2, website for genearator, Apr. 23, 2016, 1 page, https://www.ghemawat.com/cage, https://web.archive.org/web/20160423173723/https://www.ghemawat.com/cage (Year: 2016).*

List of IBM Patents or Patent Applications Treated as Related, dated Dec. 20, 2019, 2 pages.

* cited by examiner

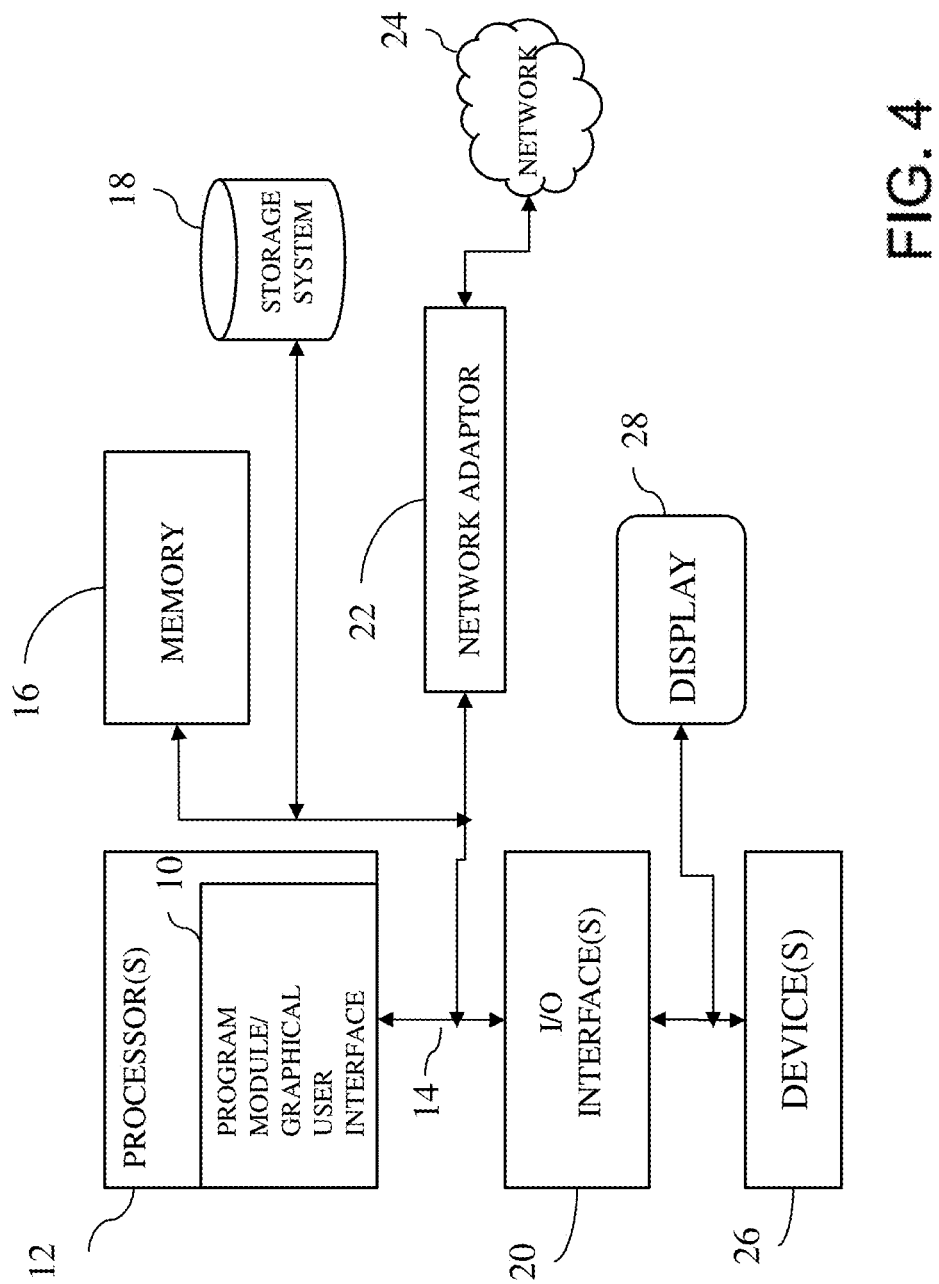

COMMUNICATION ASSISTANT TO BRIDGE INCOMPATIBLE AUDIENCE

FIELD

The present application relates generally to computers and computer applications, natural language processing, and more particularly to computer-implemented cognitive communications.

BACKGROUND

In their daily activities, people encounter communications with other people with different skills areas, from different cultures and/or different backgrounds. For instance, people in different professional fields may communicate and work with one another. In such environment, it is possible that misunderstandings and miscommunication occurs. For instance, one can be speaking with a professional in a field, and may not be able to understand the technical terms used by the professional. In addition, the same term in one industry may have a completely different definition or context in another industry. As yet another example, using "yes" language to answer a question in one culture may mean a clear understanding and agreement to the question, while in another culture an answer of "yes" may depend on the context it was used, and may hide the fact that the responding party did not actually answer the question.

BRIEF SUMMARY

A computer-implemented method and system of providing a cognitive communication assistant are disclosed. The method may be performed automatically by at least one hardware processor. The method, in one aspect, may include receiving a message transmitted over a communication network from a sender to a recipient. The method may also include determining a sender's industry identified with the sender and a recipient's industry identified with the recipient. The method may further include, responsive to determining that the sender's industry is different from the recipient's industry, extracting from the message one or more terms associated with the sender's industry, searching for a definition associated with the one or more terms in an on-line reference text associated with the sender's industry, and updating the message based on the definition. The method may also include transmitting the message over the communication network to the recipient.

A system of providing a cognitive communication assistant, in one aspect, may include at least one hardware processor operatively connected to a communication network and a storage device operatively coupled to the at least one hardware processor. The at least one hardware processor may be operable to receive a message transmitted over the communication network from a sender to a recipient. The at least one hardware processor may be further operable to determine a sender's industry identified with the sender and a recipient's industry identified with the recipient. Responsive to determining that the sender's industry is different from the recipient's industry, the at least one hardware processor may be further operable to extract from the message one or more terms associated with the sender's industry, search for a definition associated with the one or more terms in an on-line reference text associated with the sender's industry, and update the message based on the definition. The at least one hardware processor may be further operable to transmit the message over the communication network to the recipient.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 illustrates a schematic of an example computer or processing system that may implement a cognitive assistant system in one embodiment of the present disclosure.

DETAILED DESCRIPTION

A computer-implemented method, system, computer program product and/or technique for providing cognitive communication assistance may be provided. In one embodiment of the present disclosure, the cognitive communication assistance may analyze the communication messages during a conversation using a natural language processing technique. In one aspect, the cognitive communication assistance methodology of the present disclosure may improve and clarify the messages by updating or modifying the messages. For example, the methodology of the present disclosure in one embodiment may detect technical terms in the communication and substitute the terms with general definitions that help to make the message easier to understand by the recipient. The methodology of the present disclosure in one embodiment may detect cultural specific words, phrases and/or slangs in the communication and substitute them with a general explanation about how they can be interpreted. The methodology in one embodiment learns or becomes aware of the respective parties cognitive state of mind, professional skills and cultural background to help in improving the communication quality and fidelity. The methodology in one embodiment may be invoked on on-line chat conversations, voice over Internet Protocol (VoIP) solutions for conference calls and meetings, and/or in individual conversations.

Figure 1:
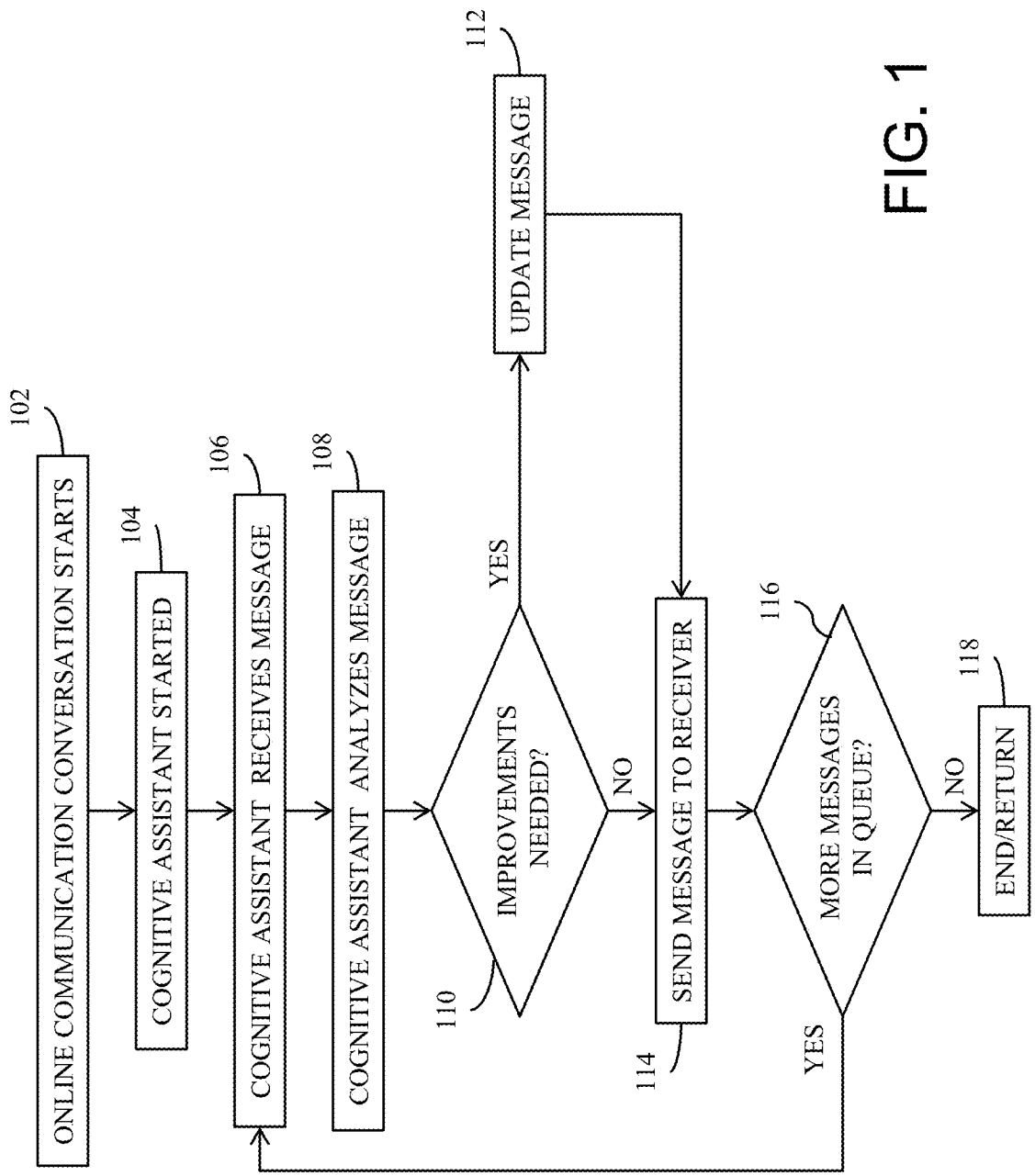
FIG. 1 is a flow diagram illustrating a cognitive communication assistance method in one embodiment of the present disclosure.

FIG. 1 is a flow diagram illustrating a cognitive communication assistance method in one embodiment of the present disclosure. At 102, conversation is started. The conversation may be an online chat, a VoIP communication, and or other electronic or online communication such as email or another.

At 104, cognitive assistant feature (also referred to as a cognitive assistant or sidekick) of the present disclosure is enabled. In one embodiment, a cognitive assistance feature may be enabled as a default setting to the tool that performs the communication (e.g., voice and/or text messages), for example, an online chat application, online meeting application, web conferencing application, other VoIP application, email application, and/or others. In another embodiment, the cognitive assistance feature may be enabled by embedding a key phrase in the conversation, for example, in a message. Yet in another embodiment, the cognitive assistance feature may be enabled by pushing a button provided on a user interface, for example, by pushing a 'start Cognitive Assistant' button or the like within the online chat tool, VoIP application or external service.

The cognitive assistant starts listening to the conversation messages. In one embodiment, cognitive assistant service or system of the present disclosure may have a profile associated with conversation participants. In VoIP example (e.g., WebEx™ from Cisco System in California, USA, SmartCloud™ from International Business Machines Corporation (IBM)® in Armonk, N.Y., USA, and/or another), existing user profiles may be leveraged and enhanced with information including: country of residence, country of birth, cultural identification variables, industry represented, and/or other, for example, with the permission of the participant.

At 106, message is received by the cognitive assistant. For instance, messages or conversation messages in the communication are received.

At 108, the cognitive assistant analyzes the message using a natural language processing or processor method. The cognitive assistant may find technical terms, for example, not used by a participant in the communication. Cultural specific terms, slangs, or the like may be substituted by, or provided with, a description of its meaning.

At 110, the cognitive assistant may determine whether improvements can be provided, for example, based on its analysis. For instance, if it is determined that the participating parties do not work in the same field of industry or are from different backgrounds or cultures, and it is determined that the conversation message include trade specific or technical terms that not all parties may understand, the cognitive assistant may determine that improvement can be provided.

If at 110 it is determined that improvement can be provided, at 112, the message is updated with improvement. For example, cultural specific terms, slangs, or the like may be substituted by, or provided with, a description of its meaning. The following illustrates an example. Participant A, a lawyer in USA is chatting with Participant B, an information technology (IT) member in USA. Participant A communicates that "The attorney did the work pro bono and the legal case was dismissed with prejudice." The cognitive assistant may find points of improvement in the communication message and update the message. For example, legal terms "pro bono" and "dismissed with prejudice" may be substituted. An example of a cognitive assistant updated message may include: "The attorney did the work at no charge and the legal case was dismissed permanently and cannot be reopened in court." The logic proceeds to 114, in which the message with the update is sent to the recipient. In one embodiment, the message may be presented with information showing which updates the cognitive assistant made. The information may be shown via visual cues or other cues. For example, the updates in the message may be annotated or labeled to convey the updated items. For instance, the original message may be shown with the substituted terms underlined (or with another annotation), and an updated message with those terms explained may be shown in italics (or with another annotation). For instance, the substituted terms and/or augmented explanation can be presented in different form from the rest of the content of the original message, for example, with visual cues such as highlights, italics, color changes, and/or other cues. An example is shown below:

Sender: The attorney did the work pro bono and the legal case was dismissed with prejudice Cognitive Assistant: The attorney did the work at no charge and the legal case was dismissed permanently and cannot be reopened in court.

In one embodiment, different levels of translation or assistance may be provided in updating the message at 112. The levels may depend on the user profile of the receiver, user profile of the sender and domain of the message. The levels may change as the cognitive assistant learns the profile changes of the user due to monitoring receiver requests, domain and/or sender messages. In one embodiment, a feedback loop may be implemented that updates the user profile. For example, a user interface object may be provided that allows a user to provide feedback of the provided explanation or translation. For instance, the updated message may be presented as a selectable or clickable object, wherein a user clicking on the updated message displays or presents a feedback option to allow the user to input feedback such as "not accurate update", "incorrect context", "incorrect translation", and/or another feedback. A recipient may also input feedback noting which updates were not required. Cognitive assistant in one embodiment of the present disclosure may continually learn and update profiles for individuals to continue to improve in providing accurate explanation.

If at 110 it is determined that no improvement may be needed, the logic proceeds to 114, for example, and the message is sent to the recipient without an update or modification.

At 116, it is determined whether there are more messages, for example, in a queue of messages for analysis. If so, for example, another message arrives, the logic continues to 106 to iterate the process. If there are no more messages, for example, the communication or conversation has ended or finished, the logic may end or exit.

Figure 2:
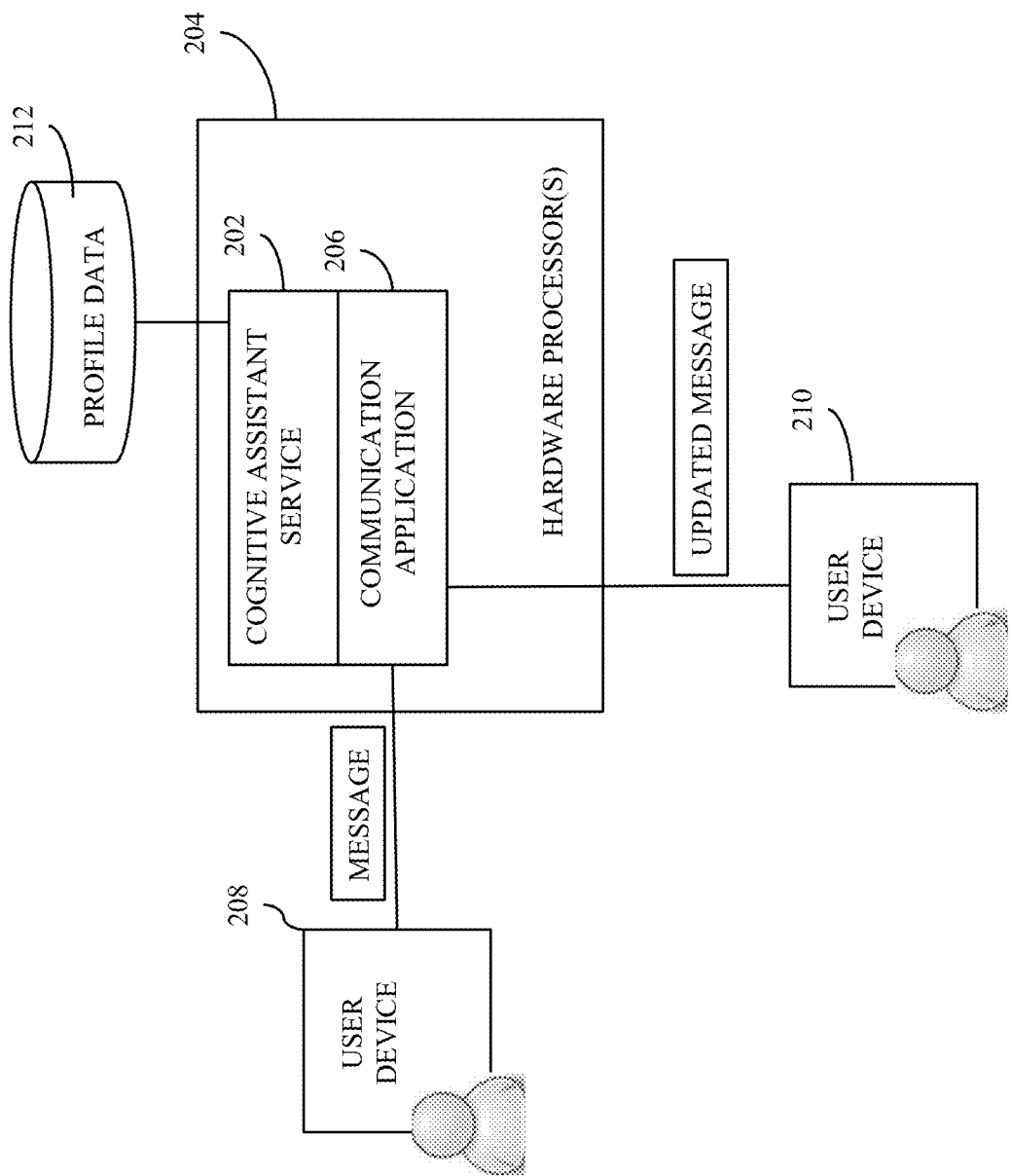
FIG. 2 is a diagram illustrating a cognitive assistance system or service in one embodiment of the present disclosure.

FIG. 2 is a diagram illustrating a cognitive assistance system or service in one embodiment of the present disclosure. In one embodiment, a cognitive assistant 202 may execute on one or more hardware processors 204, and process messages, for example, as described with reference to FIG. 1. The cognitive assistant 202 in one embodiment is a computer-executable component, for example, that works with a communication system or application 206 such as online communication application (e.g., chat, web conference, web meeting or another online meeting, and/or others). The cognitive assistant may be a plug-in to a communication application or tool, or may be implemented as an integral part of a communication application or tool. In one embodiment, the cognitive assistant 202 may simplify and clarify communication in a given language based on the audience background and context.

For example, a message may be sent from user A (e.g., user device 208) to user B (e.g., user device 210) via the communication application 206. The cognitive assistant may be enabled to receive the message and provide its service. Responsive to receiving the message, for example, the cognitive assistant may determine the sender and receiver(s) of the message and identify the industry associated with the sender and receiver(s). For instance, existing profiles 212 (e.g., stored in a storage device) may be accessed to determine sender and receiver information. A storage device, for example, may store a database of user profiles 212. In another aspect, the cognitive assistant may send a request to the user or user's device when the conversation starts, asking for the industry information associated with the sender and receiver. For instance, a pop-up menu or another screen object may be displayed on a user's device (e.g., 208, 210) that asks the user to input the industry the user is associated with. In another aspect, a voice prompt may ask the user's for input to identify the industry. Other techniques may be used to directly ask the user and receive a response from the user. In one embodiment, one or all of the participants in the conversation whose industry information is not available from the profile data 212 may be prompted to enter the user's industry.

Based on the profile information or user input information, the cognitive assistant service 202 may determine whether the messages should be updated with clarification or another improvement. For example, if the cognitive assistant service 202 determines that the sender is identified with industry that is different from the one with which the recipient is identified, the cognitive assistant service 202 determines that the message should be updated and proceeds to provide improvement to the message. For example, in one embodiment, responsive to receiving a message being communicated, the cognitive assistant service 102 extracts the terms specific from the industry identifies with the sender. To identify these terms, the cognitive assistant service may use industry specific reference text, e.g., industry dictionaries, industry term definitions, acronym glossaries, and/or others. For example, if the industry is Health then a Medical Terms dictionary may be used to extract the terms. The cognitive assistant service uses the definition of the extracted terms and updates the message to include the definition in a form that is easily consumable by the recipient (audience) of the message. For instance, the industry specific technical terms may be substituted or augmented with a general explanation that is understood by the layperson outside of the industry. In one embodiment, a recipient of the message may be allowed to provide a feedback such as whether the updated explanation is correct, whether it helped or was not needed, and another feedback. The cognitive assistant 202 may received the feedback information and update the profile 212 for use in future communication.

Similar methodology may be performed responsive to the cognitive assistant service 202 determining that the sender and the recipient are from different cultural environment. For example, specific terms used in the sender's cultural environment may be extracted from a culture specific reference text, for example, dictionaries, language anthologies, and/or the like. Those terms in the message may be replaced or augmented with the language the recipient can understand.

Figure 3:
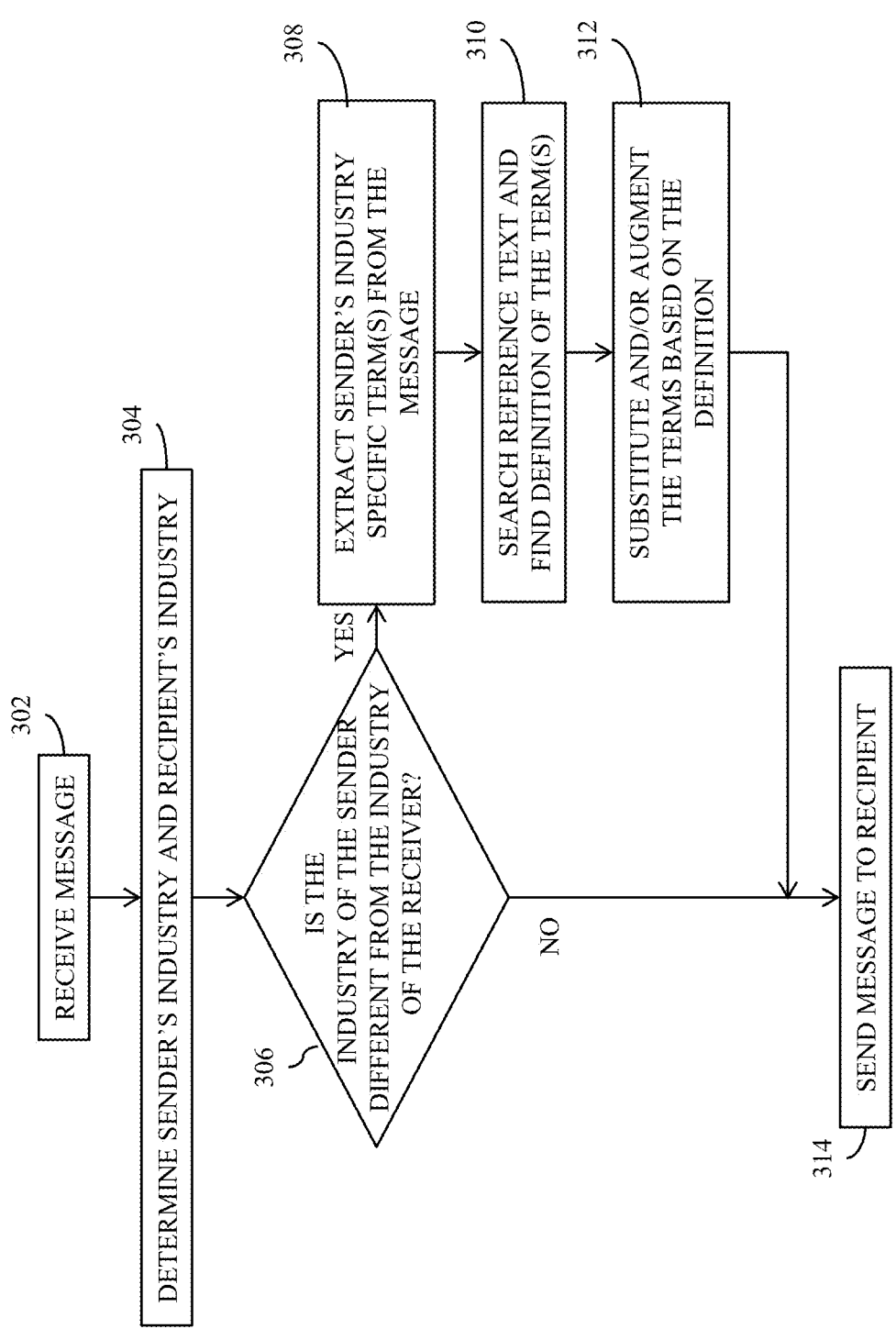
FIG. 3 is another flow diagram illustrating a method of the present disclosure in one embodiment.

FIG. 3 is another flow diagram illustrating a method of the present disclosure in one embodiment. At 302, a message is received, for example, by listening in on an online communication session between a sender and a recipient. At 304, message sender's industry and message recipient's industry are identified. Determining sender's industry and recipient's industry at 304 may include looking up a respective user profile, and if user profile is not available or the industry information associated with the user is not available in the user profile, asking the sender and/or the recipient for the industry identification. For instance, a pop-up menu on a graphical user interface on a user's device may be displayed, prompting for the user to input the industry information. At 306, it is determined whether the sender's industry and the recipient's industry are different. At 308, responsive to determining that the recipient's industry is different from the sender's industry, one or more specific industry terms are extracted from the message. At 310, reference text is searched to find one or more definitions of those one or more terms. Reference text may include online data or text stored on the Internet or web servers that may be searchable, and/or other accessible online data. At 312, based on the definition found in the reference text, one or more terms in the message are substituted and/or augmented with an explanation understandable by the recipient. For instance, the content of the message to be transmitted to the recipient is updated with definition and/or explanation of the industry term(s) so that the recipient may better understand the communication message. At 314, the message is sent or transmitted to the recipient.

In one embodiment, the cognitive assistant considers the specific audience or recipient, the audience's industry backgrounds and optionally their specific command of the language being used. The cognitive assistant may accumulate data over time and add it to individual's background profiles with the permission of the individual to improve processing on future communication. For instance, feedback information may be received and used in future communication. The cognitive assistant may add a training loop to take user input or conversational feedback to better identify words or phrases that were missed in initial communication updates.

In addition, a curve or distance matrix for considering a distance factor across participant industries may be generated and used in updating messages. For example, participants who are engineers albeit in different fields of engineering may have an overlapping use of technical terms, while industries that are farther apart may have less of a technical term overlap. Therefore, for example, a conversation among participants who are engineers (even if they are in different engineering fields) may not need one or more engineering terms further explained or clarified while a conversation that includes a non-engineer may need an engineering term clarified. Based on the distance between the industry of the participants, for example, specified in the distance matrix, the cognitive assistant may determine which terms in the message are candidates for substitution and/or explanation. For example, determining whether the sender's industry and the recipient's industry may be done based on the distance factor saved or stored in a distance matrix. The distance factor may be a binary value or a value between a range. For instance, a distance factor between two industries specified as a binary '1' may indicate that the industries are far apart not to have overlapping use of terms, such that specific terms used in one industry should be substituted in the message, and a binary '0' may indicate otherwise, e.g., the industries share the same term and hence presume that no translation may be needed. In an example in which the distance factor may be specified as a value in a range of values, whether to substitute or translate a term may be determined based on whether a distance factor value meets a threshold value.

FIG. 4 illustrates a schematic of an example computer or processing system that may implement a cognitive assistant system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a cognitive assistant module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The system and method of the present disclosure in one embodiment may also be implemented as one or more microservices, for example, developed via cloud platforms leveraging existing microservices and combining those with custom services to create cloud solutions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of providing a communication assistant, the method performed automatically by at least one hardware processor, the method comprising:
  receiving a message transmitted over a communication network from a sender to a recipient in an online communication application;
  determining a sender's industry identified with the sender and a recipient's industry identified with the recipient;
  responsive to determining that the sender's industry is different from the recipient's industry, extracting from the message one or more terms associated with the sender's industry,
  searching for a definition associated with the one or more terms in an on-line reference text associated with the sender's industry, and updating the message based on the definition;
  transmitting the message over the communication network to the recipient;
  wherein the message presented to the recipient comprises an updated term presented as a selectable user interface object, wherein the selectable user interface object responsive to selection is operable to present a feedback option via which user feedback can be input, the feedback option including at least that the updated term has incorrect context and a feedback option to note which update was not required,
  wherein different levels of translation is provided in updating the message, the levels dependent on a user profile of the recipient, and the levels change as the communication assistant continually learns and updates the user profile based on the user feedback.

2. The method of claim 1, wherein the updating comprises substituting the one or more terms with explanation understandable by the recipient.

3. The method of claim 1, wherein the determining a sender's industry comprises searching a user profile associated with the sender.

4. The method of claim 1, wherein the determining a recipient's industry comprises searching a user profile associated with the recipient.

5. The method of claim 1, wherein the determining a sender's industry comprises causing a screen object to be displayed on a user interface and requesting the sender to input the sender's industry via the user interface.

6. The method of claim 1, wherein the determining a recipient's industry comprises causing a screen object to be displayed on a user interface and requesting the recipient to input the recipient's industry via the user interface.

7. The method of claim 1, wherein the method is performed by an online communication tool that allows the sender and the recipient to communicate over the Internet.

8. The method of claim 1, the method further comprising generating a distance matrix specifying distance factor between a plurality of industries, and determining that the sender's industry is different from the recipient's industry based on the distance factor between the sender's industry and the recipient's industry.

9. A computer program product for providing a communication assistant, the computer program product comprising a computer readable storage medium having program instructions embodied therewith, wherein the computer readable storage medium is not a transitory signal per se, the program instructions readable by a device to cause the device to perform a method comprising:
  receiving a message transmitted over a communication network from a sender to a recipient in an online communication application;
  determining a sender's industry identified with the sender and a recipient's industry identified with the recipient;
  responsive to determining that the sender's industry is different from the recipient's industry, extracting from the message one or more terms associated with the sender's industry,
  searching for a definition associated with the one or more terms in an on-line reference text associated with the sender's industry, and updating the message based on the definition;
  transmitting the message over the communication network to the recipient;
  wherein the message presented to the recipient comprises an updated term presented as a selectable user interface object, wherein the selectable user interface object responsive to selection is operable to trigger presenting of a feedback option via which user feedback can be input, the feedback option including at least that the updated term has incorrect context and a feedback option to note which update was not required,
  wherein different levels of translation is provided in updating the message, the levels dependent on a user profile of the recipient, and the levels change as the communication assistant continually learns and updates the user profile based on the user feedback.

10. The computer program product of claim 9, wherein the updating comprises substituting the one or more terms with explanation understandable by the recipient.

11. The computer program product of claim 9, wherein the determining a sender's industry comprises searching a database stored on a storage device storing a user profile associated with the sender.

12. The computer program product of claim 9, wherein the determining a recipient's industry comprises searching a database stored on a storage device storing a user profile associated with the recipient.

13. The computer program product of claim 9, wherein the determining a sender's industry comprises causing a screen object to be displayed on a user interface and requesting the sender to input the sender's industry via the user interface.

14. The computer program product of claim 9, wherein the determining a recipient's industry comprises causing a screen object to be displayed on a user interface and requesting the recipient to input the recipient's industry via the user interface.

15. The computer program product of claim 9, wherein the method is performed by an online communication tool that allows the sender and the recipient to communicate over the Internet.

16. A system of providing a communication assistant, comprising:
  at least one hardware processor operatively connected to a communication network;
  a storage device operatively coupled to the at least one hardware processor;
  the at least one hardware processor operable to receive a message transmitted over the communication network from a sender to a recipient in an online communication application;
  the at least one hardware processor further operable to determine a sender's industry identified with the sender and a recipient's industry identified with the recipient;
  responsive to determining that the sender's industry is different from the sender's industry, the at least one hardware processor further operable to extract from the message one or more terms associated with the sender's industry, search for a definition associated with the one or more terms in an on-line reference text associated with the sender's industry, and update the message based on the definition;
  the at least one hardware processor further operable to transmit the message over the communication network to the recipient;
  wherein the message presented to the recipient comprises an updated term presented as a selectable user interface object, wherein the selectable user interface object responsive to selection is operable to present a feedback option via which user feedback can be input, the feedback option including at least that the updated term has incorrect context and a feedback option to note which update was not required,
  wherein different levels of translation is provided in updating the message, the levels dependent on a user profile of the recipient, and the levels change as the communication assistant continually learns and updates the user profile based on the user feedback.

17. The system of claim 16, wherein the at least one hardware processor updates the message by substituting the one or more terms with explanation understandable by the recipient.

18. The system of claim 16, wherein the at least one hardware processor is operable to search a database stored on the storage device storing a user profile associated with the sender to determine at least one of the sender's industry and the recipient's industry.

19. The system of claim 16, wherein the at least one hardware processor is operable to cause a screen object to be displayed on a user interface and prompt for input for at least one of the sender's industry and the recipient's industry.

20. The system of claim 16, wherein the at least one hardware processor is operable to determine that the sender's industry is different from the recipient's industry based on a distance factor between the sender's industry and the recipient's industry specified in a distance matrix that stores distance factors between a plurality of industries.

\* \* \* \* \*